US012669829B2

(12) United States Patent
Buerkle et al.

(10) Patent No.: US 12,669,829 B2
(45) Date of Patent: Jun. 30, 2026

(54) EMERGENCY MANAGEMENT USING ROBOT FLEET

(71) Applicant: Intel Corporation, Santa Clara, CA (US)

(72) Inventors: Cornelius Buerkle, Karlsruhe (DE); Rita Chattopadhyay, Chandler, AZ (US); Frederik Pasch, Karlsruhe (DE); Pradeep Sakhamoori, Chandler, AZ (US); Fabian Oboril, Karlsruhe (DE); Mohammad Haghighipanah, Tigard, OR (US); Qutub Syed Sha, Munich (DE)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 18/398,299

(22) Filed: Dec. 28, 2023

(65) Prior Publication Data

US 2025/0216859 A1 Jul. 3, 2025

(51) Int. Cl.
*G05D 1/617* (2024.01)
*G08B 7/06* (2006.01)
*G05D 101/00* (2024.01)
*G05D 105/55* (2024.01)

(52) U.S. Cl.
CPC ............. *G05D 1/617* (2024.01); *G08B 7/066* (2013.01); *G05D 2101/22* (2024.01); *G05D 2105/55* (2024.01)

(58) Field of Classification Search
CPC ............... G05D 1/617; G05D 2101/22; G05D 2105/55; G05D 2017/70; G05D 2109/10; G05D 1/246; G05D 1/6987; G08B 7/066
See application file for complete search history.

(56) References Cited

U.S. PATENT DOCUMENTS

| 10,777,051 | B1 * | 9/2020 | Kumar | G08B 7/066 |
| 2018/0308326 | A1 * | 10/2018 | Miwa | G08B 7/066 |
| 2021/0287521 | A1 * | 9/2021 | Stone | G05B 13/0265 |
| 2022/0254234 | A1 * | 8/2022 | Norcross | G07C 9/00174 |
| 2022/0283590 | A1 * | 9/2022 | Deyle | G05D 1/0246 |
| 2024/0395121 | A1 * | 11/2024 | Nallusamy | G06Q 50/163 |

FOREIGN PATENT DOCUMENTS

EP 3570134 B1 * 6/2021 ........... G01C 21/206

OTHER PUBLICATIONS

Shingleton, Sara, "Warehouse Safety: Fire Risk Reduction and Response", The Network Effect, https://supplychainbeyond.com/warehouse-safety-fire-risk-reduction-response/, retrieved on Nov. 7, 2023, 6 pages.

(Continued)

*Primary Examiner* — Kito R Robinson
*Assistant Examiner* — Alexander V Gentile
(74) *Attorney, Agent, or Firm* — Viering, Jentschura & Partner mbB

(57) ABSTRACT

A server includes a memory on which a map is stored, wherein the map represents locations of a plurality of mobile units; and a processor, configured to generate an emergency response plan based on sensor data and the map, wherein the emergency response plan comprises actions to be taken by a plurality of robots within a vicinity of the mobile units; and instruct a transceiver to send a signal representing the emergency response plan.

19 Claims, 7 Drawing Sheets

(56) References Cited

OTHER PUBLICATIONS

Malhotra, Krish, "What Are ESFR Sprinkler Systems And How Are They Different From Conventional Fire Sprinklers?", https://millbrookfireprotection.com/events/what-are-esfr-sprinkler-systems-and-how-are-they-different-from-conventional-fire-sprinklers/, retrieved on Nov. 7, 2023, 14 pages, MillBrook Fire Protection.

Fire Systems Inc., "Fire Alarm Inspection Services", https://firesystems.net/inspections/fire-alarms-monitoring/, retrieved on Dec. 28, 2023, 3 pages.

Wikipedia, https://en.wikipedia.org/wiki/File:Fire_door.jpg, retrieved on Nov. 7, 2023, 3 pages.

Warehouse Lighting, "Emergency Lighting Requirements for Commercial Buildings", https://www.warehouse-lighting.com/blogs/lighting-blog/whats-required-in-emergency-lighting, retrieved on Dec. 28, 2023, 2 pages.

Alesayi Storage Systems, "In-Rack Sprinkler Systems", https://alesayistorage.com/products-solutions/in-rack-sprinkler-systems/, retrieved on Nov. 7, 2023, 3 pages.

Safelincs Fire & Safety Solutions, "How Optical Smoke Alarms Work—Safelines", https://www.safelincs.co.uk/smoke-alarm-types-optical-alarms-overview/, retrieved on Dec. 28, 2023, 3 pages.

Wikipedia, "Aspirating smoke detector", https://en.wikipedia.org/wiki/Aspirating_smoke_detector, retrieved on Nov. 7, 2023, 3 pages.

Wikipedia, "Wireless Emergency Alerts in Germany", retrieved on Dec. 28, 2023, 3 pages.

* cited by examiner

Memory 404

Processor 406

Transceiver 408

410

402

Memory 704

Processor 706

Transceiver 708

702

EMERGENCY MANAGEMENT USING ROBOT FLEET

TECHNICAL FIELD

Various aspects of this disclosure generally relate the use of robots to manage emergency situations, such as in a warehouse environment.

BACKGROUND

Warehouse fires are surprisingly common, and such fires may result in any of injury, loss of human life, and damage to property. Beyond fires, other situations may similarly pose a threat to human safety and/or property damage, such as floods, earthquakes, severe storms, or other natural disasters. Current strategies for maintaining safety and/or minimizing property loss include reactive solutions, such as the use of water sprinklers, which themselves may generate property damage. Moreover, existing solutions treat all goods within a warehouse as having equal value and fail to prioritize the need to protect some goods at the expense of others. Furthermore, existing solutions do not take into account the hazard to human safety and life that is created by damage to goods and/or damaged shelving during an emergency situation.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
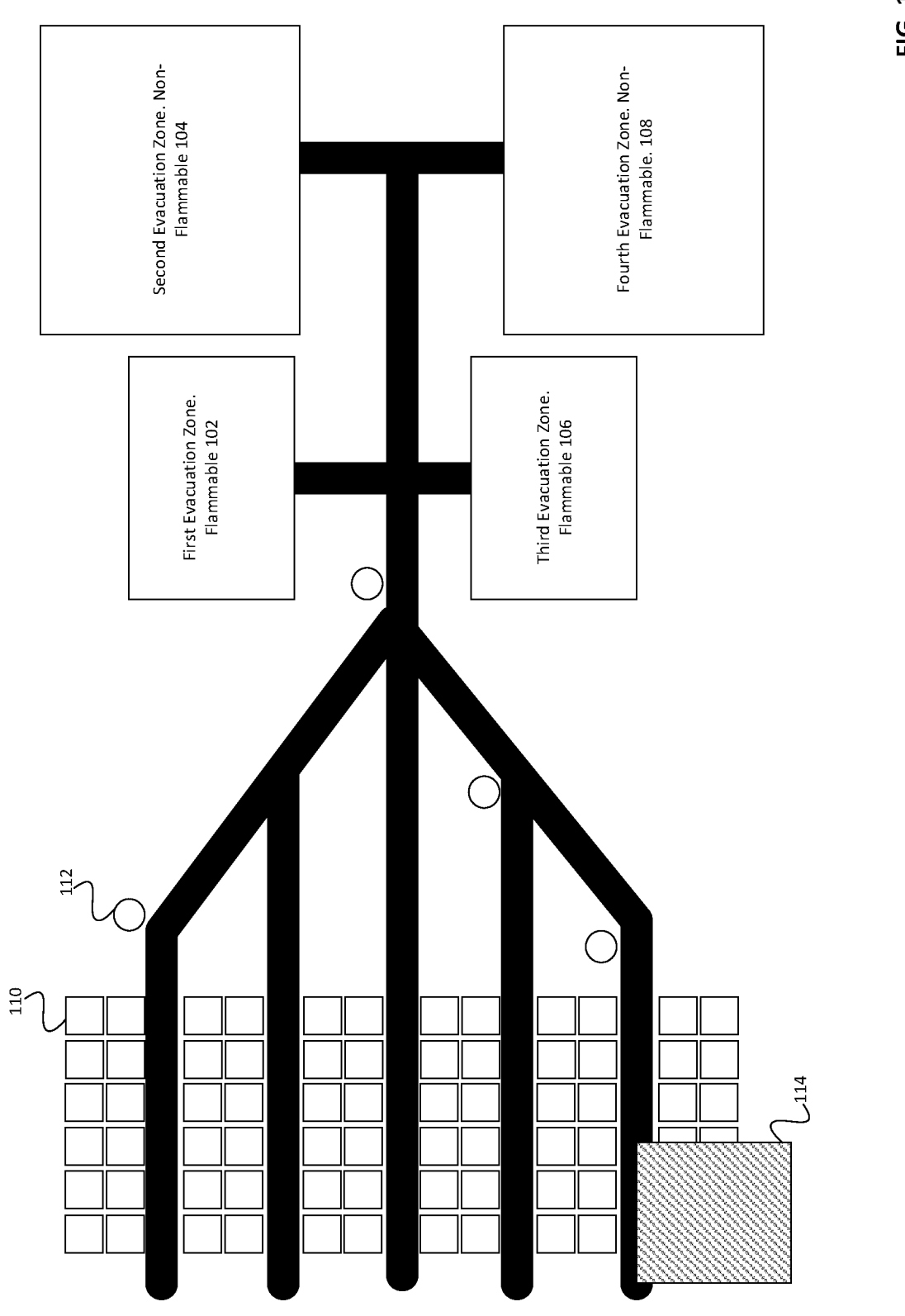
FIG. 1 depicts an example of a warehouse in which an emergency procedure is initiated.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Throughout this disclosure, the term "robot" is used. A robot, as used herein, is intended to refers to any unmanned, autonomous device, whether a land-based device or an aerial device. That is, a robot may be or include a land-based autonomous robot and/or an unmanned aerial vehicle.

Throughout this disclosure, the term "mobile unit" is used at least to refer to any mobile device on which goods may be stored. As described herein, other environments beyond a warehouse are contemplated, and therefore the term mobile unit should be understood sufficiently broadly as to encompass any setting in which the emergency management principles as disclosed herein may be implemented. In particular, the principles and methods disclosed herein may be implemented in a hospital environment, such that patient beds may be analogous to the mobile units used throughout. The term mobile unit should be understood to be sufficiently broadly to incorporate such patient beds.

In the first aspect of the disclosure, various strategies for mitigating damage and risk arising from fire or natural disasters are described. This may have particular relevance in a warehouse environment, such as a where goods may be present, and may be stacked for ease of movement on mobile units. The principles and methods disclosed herein may include the movement or evacuation of mobile units during an emergency, according to a priority-based evacuation plan.

In most autonomous warehouses, items are stored and organized on mobile units. The mobile unit conventionally has an autonomous mobile robot at the bottom (the robot may be a part of the mobile unit, or the robot may be independent of the mobile unit and travel from mobile unit to mobile unit as needed for movement of goods), which moves the mobile units around in a warehouse.

Although conventional mobile units are little more than a rack on which goods rest, meaningful benefit may be achieved by equipping the mobile units with sensors, which may provide valuable information that can be used in the emergency management procedures disclosed herein. For example, the mobile units may be equipped with sensors to detect signs of an emergency situation. This may include one or more smoke detectors, one or more fire detectors (e.g. heat sensor), one or more gas detectors (e.g. carbon monoxide), or the like. These may be in addition to the sensors that may already be in the warehouse itself, such as other smoke detectors or the like, or even access to a larger, more systemic emergency notification system (e.g. a system to alert a city to a natural disaster). In any event, once a fire or other emergency situation is detected—and regardless of whether the fire or emergency situation is detected by a warehouse sensor or a mobile unit sensor, the fire or emergency signal may be sent to an edge server, and the edge server may analyze/assess the situation to initiate an emergency plan.

Beyond merely detecting the presence of an emergency situation, additional sensors may be present to evaluate the health of the various mobile units. An underlying assumption here is that an emergency situation may decrease the overall mobile unit health. For example, heat from a fire may warp a mobile unit or otherwise weaken the structural integrity of a mobile unit; burning mobile units may be damaged in a variety of ways; and other events such as explosions, objects falling on the mobile units, or objects being propelled into the mobile units may also negatively affect the mobile unit's health.

The mobile unit's health is, however, a meaningful criterion for a priority-based evacuation plan. That is, if the mobile unit's health is poor, the chance of its survivability is low, and therefore the mobile unit may not be selected to be moved to a safe zone.

In one configuration, the health of each mobile unit may be measured by checking both the robot that is under the mobile unit (or if not fixed robot, moving a robot beneath the mobile unit) and the mobile unit itself. Using, for example, the inertial measurement unit (IMU) and wheel encoders of the robot, the robot may wiggle the robot (e.g. implement a back and forth motion) to check if the moving components of the robot are functioning. Further, the robot itself may inform the edge server if any of the mobile unit's sensors are damaged.

Using a camera and temperature sensor on the mobile unit, the edge server may determine if the mobile unit itself is on fire. For example, should flames be detected in the camera data, this would an indication that fire is present. In this manner, a camera of any given mobile unit may detect fire in that mobile unit, or in any other mobile unit within its camera's line of sight. This can also be applied to other sensors, such as detecting a flood using the mobile unit's moisture sensor, etc. Finally, the edge server module may consider the health of robot (assuming that the robot is part of the mobile unit itself) and the health of the mobile unit to provide a health score for each mobile unit. The health score may be used in the optimizer for mobile unit selection.

Additional measures can be taken to protect goods on the mobile units, or even the mobile units themselves. Here, it may be of particular importance to protect goods from water damage that would occur during efforts to quell a fire. That is, in emergencies, the fire sprinkler system may activate, thereby causing large quantities of water to rain from the ceiling, which may itself damage items on the mobile units. To minimize the risk of water damage, a water resistant drop down curtain may be attached to the mobile units, and this water resistant curtain may be lowered during emergencies. Moreover, to prevent the items that are stored in these mobile units from burning, the mobile units may be equipped with fire resistant and/or a water resistant curtain curtains, which may similarly be lowered around the mobile units in the event of a fire.

A plurality of robots for emergency response (also referred to herein as Emergency Response Robots or ERRs) may be equipped with various resources for responding to an emergency situation. For example, the robots may be equipped with one or more fire extinguishers (for example, any or all of the five classes of fire extinguishers (e.g., Class A, Class B, Class C, Class D, and Class K). The plurality of robots may include multi-modality redundant sensors such as Radar, LiDAR, and cameras, such that the plurality of robots are able to perform a Simultaneous Localization and Mapping (SLAM) analysis, such as in low light and/or harsh environments. The plurality of robots may include a robust drivetrain, such that the robots may operate on rough terrain.

The EERs may be assigned any of the following duties:

First, the ERRs may be tasked with guiding humans to a safe zone. Based on the received sensor data, the edge server may designate a first portion of the vicinity as being an area of increased risk of harm, and a second portion of the vicinity as being an area of relative safety. The EERs may be tasked with locating and/or approaching humans within the first portion of the vicinity and guiding them to the second portion of the vicinity. This may be done by accompanying the humans from the first portion of the vicinity to the second portion of the vicinity, illuminating the way from the first portion of the vicinity to the second portion of the vicinity, verbally instructing the humans how to reach the second portion of the vicinity, gesticulating toward the second portion of the vicinity, or otherwise using any technique to guide the humans to safety.

Second, the ERRs may be tasked with guiding mobile units into a safe zone. Otherwise self-propelling mobile units (mobile units including their own motor and equipment for self-locomotion within a warehouse environment) may lack sufficient sensors to safely navigate themselves in certain emergency situations. In these instances, the ERRs may guide the mobile units along a safe path from the first portion of the vicinity to the second portion of the vicinity. This guidance may be performed by the robots literally leading the way, illuminating the path for the mobile units, or sending messages or instructions (e.g. wirelessly as a radio communication, via a optical link, or otherwise) including additional information to assist the mobile units in reaching the second portion safely. Should the mobile units themselves not be equipped with a motor for self-locomotion, the ERRs may move the mobile units themselves from the first portion of the vicinity to the second portion of the vicinity.

Third, the ERRs may be configured to perform one or more fire suppression activities (assuming that the emergency situation is in fact fire). That is, these robots, which may be equipped with one or more fire extinguishers, as described above, may utilize the fire extinguishers to contain the fire, prevent the fire from spreading, or even extinguish the fire. These robots may be configured to communicate with the edge server to determine the various products, and correspondingly the various product properties, within a vicinity of the robot and/or within the fire zone. Using this information, the ERRs may be configured to select one or more fire extinguishing substances for use in fire containment. For example: hazardous material such as lithium batteries may produce toxic frames when ignited. Such materials should receive specific treatment/planning.

Fourth, the ERRs may be configured to obtain sensor information regarding the warehouse and/or their surroundings, and to update a map of the warehouse and/or surroundings based on the sensor data. This may include, for example, updating the map to reflect the presence of obstacles or obstructions along a path for travel. This may take into consideration the fact that, in an emergency situation, various items may shift or become relocated, and such shifted or relocated items may functionally become an obstacle or hindrance for the mobile units.

The edge server and/or the ERRs may utilize an optimization formula, so as to reduce damage during emergencies by optimizing mobile unit selection. In this optimization formula, the sum of the values in each mobile unit, the distance of the mobile unit from the danger zone, and the health of the mobile unit are may be considered. This optimization formula can be understood as follows:

$$\text{Optimize } R_i \text{ subject to}: w_1 R(v) + w_2 R(d) + w_3 R(h) \tag{1}$$

wherein $v \rightarrow$ Total value of the items that are stored $\in$ mobile unit (R); $d \rightarrow$ Mobile unit (R) distance from the danger (fire) zone; $h \rightarrow$ Health of the mobile unit (R); and $w1 \ldots w3 \rightarrow$ Weight component(s).

This optimization problem ensures the selection of a mobile unit that is healthy (i.e., not damaged so that the mobile unit can travel to a safe place), closest or at least close to the danger zone, so that it can leave the harsh environment as soon as possible before it gets damaged, and is carrying a high value of goods.

Other objectives may be added to the optimization formula. For example, if a mobile unit contains hazardous materials, it may be desirable to move the mobile unit away from the danger zone immediately, provided that the mobile unit is not already burning.

It may be desirable to designate one or more zones in the environment as safe zones and/or zones that are preselected for evacuation zones (e.g. zones along or through which objects or persons may travel while being evacuated). Evacuation zones may be given specific categories or subcategories. For example, an evacuation zone may be categorized as a flammable zone (e.g. a zone including flammable materials) or a non-flammable zone (e.g. a zone lacking flammable materials). As the categories are not limited, other example categories include a wet zone and a dry zone, a water tolerant zone and a water intolerant zone, a hazardous materials zone and a non-hazardous materials zone, etc.

The edge server and/or the robots may utilize sensor information to determine whether a zone is reaching its capacity. That is, is a total number of persons in the zone near, at, or above the total acceptable number of persons for the zone; is a total number of mobile units in the zone near, at, or above an acceptable total number of mobile units in the zone; is a total number of flammable goods in the zone near, at, or above the total acceptable number of flammable goods in the zone, etc.

In an optional configuration, the floor of the vicinity (e.g. the floor of the warehouse) may be equipped with lights (e.g. floor lights, overhead lights illuminating on the floor, etc.), which may indicate an exit path. These lights may be turned on in emergencies, so that the lights being illuminated is closely linked to there being an active evacuation plan.

In a further optional configuration, these lights may have variable frequencies. These variable frequencies may be utilized to cause a robot to travel along a preferred path. That is, a first portion of the floor path may be illuminated in a first frequency, wherein the first frequency may hypothetically indicate that the path is not safe for travel or that, in any event, travel is not advised along that path. A second portion of the floor path may be illuminated in a second frequency, wherein the second frequency may hypothetically indicate that that portion of the floor path is safe for travel. Beyond merely designating paths as safe or non-safe, the frequencies may be used for any other category or purpose, such as by designating a portion of the floor as appropriate for flammable materials, as appropriate for non-flammable materials, as appropriate for water tolerant materials, as appropriate for water intolerant materials, as appropriate for heat tolerant materials, as appropriate for heat intolerant materials, etc.

Although particular emphasis has been placed herein on a warehouse environment, the principles and methods disclosed herein are not limited to use within a warehouse, but can rather be readily applied to other environments. One such environment may include a hospital. Although the aims of a hospital are quite different from those of the warehouse, hospitals may experience emergency situations (e.g. fires, floods, earthquakes, other natural disasters, etc.), and it may be of extreme importance in such situations to evacuate patients from the hospital, or to move the patients to a safe zone within the hospital. This requires many of the same functionalities as described above with respect to a warehouse, such as designating a first portion of the hospital as being an area of increased risk and a second portion of the hospital as being an area of safety, and moving patient beds from the first area to the second area. Analogous to testing the mobile units in a warehouse, it may become necessary or desirable to test a patient's bed for its structural integrity, so as to determine whether the bed can safely be moved from an area of increased risk of harm to a safe area. In the event that a bed is sufficiently damage that it cannot be moved, emergency measures may be initiated to evacuate the corresponding patient, whether by moving the patient to a new bed, carrying the patient out of the danger zone, or otherwise.

Similarly, although great emphasis has been placed on fires, the principles and methods disclosed herein can be applied to any kind of natural disaster. Of course, the strategies for a fire may require slight modification to be appropriate for another natural disaster. For example, whereas a fire may require the movement of mobile units from an area where the fire is present to the area where a fire is not present, flooding is largely expected to occur in all areas at the same elevation. Thus, movement of mobile units (e.g. from an area of increased danger to an area of reduced danger) may become less important than movement of the goods from a lower position on the mobile unit to a higher position on the mobile unit. Relatedly, in the event of a tornado or other severe weather storm, it may be desirable to move the mobile units away from windows or exterior walls and toward areas protected on all sides by interior walls, or into a basement.

FIG. 1 depicts an example of a warehouse in which an emergency procedure is initiated. This warehouse includes a first evacuation zone 102, a second evacuation zone 104, a third evacuation zone 106, and a fourth evacuation zone 108. Each of the first evacuation zone 102 and the third evacuation zone 106 are reserved for flammable items, whereas the second evacuation zone 104 and the fourth evacuation zone 108 are reserved for non-flammable items. Although not drawn to scale, it can be seen from the relative sizes of the evacuation zones that the zones have differing capacities, and therefore the optimization formula as described herein may determine which mobile unit to assigned to which zone, such as based on the product or products on the mobile unit and the mobile unit's distance to the respective zone. The warehouse further includes a plurality of mobile units (as indicated by the square boxes; a sample mobile unit is labeled as 110). The warehouse area further includes a plurality of robots (as indicated by the circles; a sample robot is labeled as 112). In this example, a fire is detected in the lower left portion of the warehouse, as indicated by 114. As described herein, the mobile units may be equipped with various sensors, which may be capable of detecting fire. In this instance, the mobile units' sensors detect fire 114 and report this to the edge server. The edge server deploys a plurality of robots to the fire location, such as with fire extinguishers to control the fire until the fire department arrives. Meanwhile, other robots are deployed along safe paths to guide the mobile units to safety.

Figure 2:
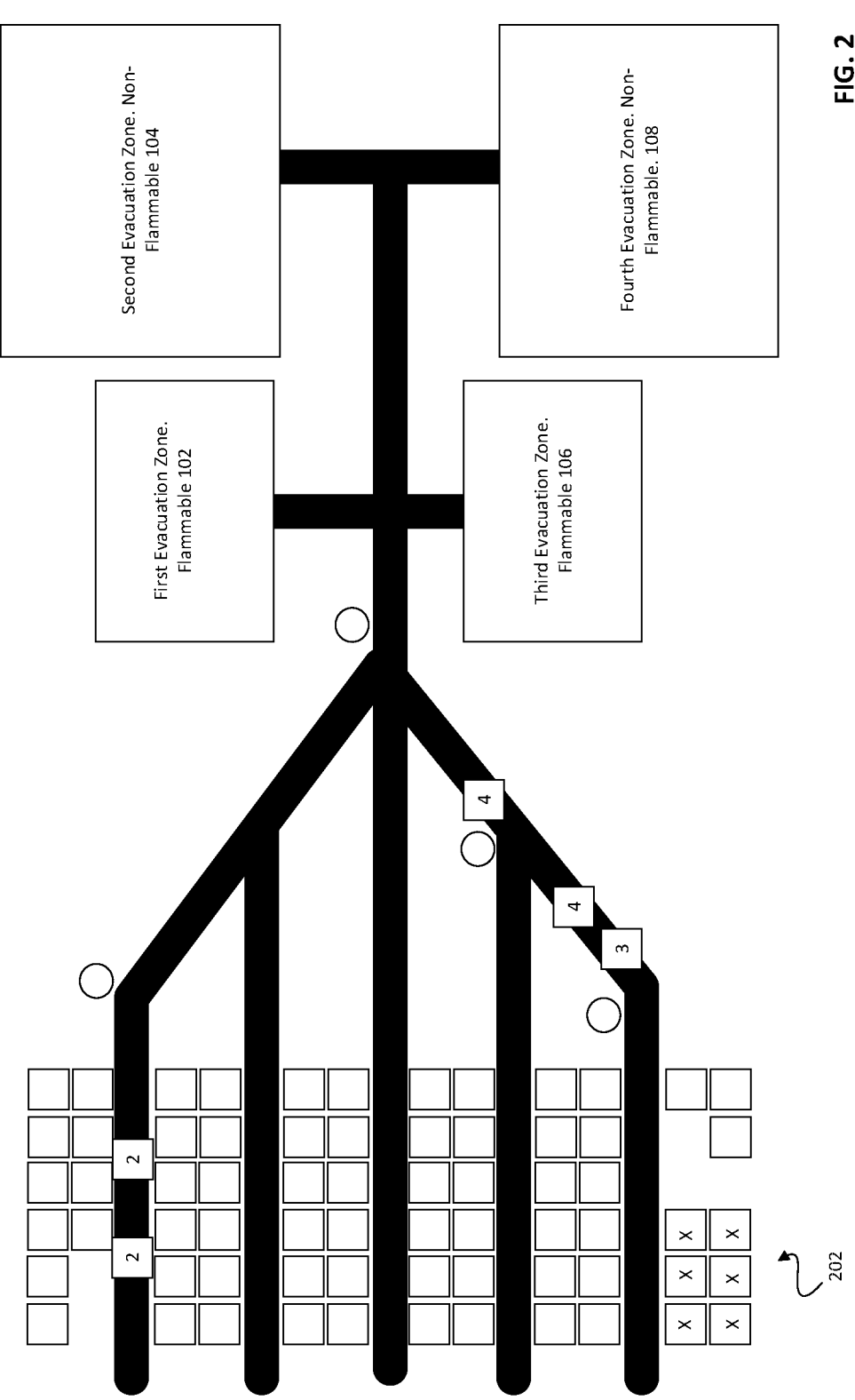
FIG. 2 depicts an evacuation or relocation of the mobile units, following implementation of the optimization formula.

FIG. 2 depicts an evacuation or relocation of the mobile units, following implementation of the optimization formula. In this figure, the group of mobile units designated with an 'x' and numbered 202 are determined to have been damaged by the fire and cannot be relocated. As such, they will remain in their current positions. Various other mobile units in this figure are depicted with a number, such as 2, 3, or 4. These correspond to the evacuation zone in which the mobile unit is being sent. For example, the mobile units identified with a 2 are being sent to the second evacuation zone 104; the mobile unit identified with a 3 is being sent to the third evacuation zone 106; and the mobile units identified with a 4 are being sent to the fourth evacuation zone 108. For clarity, the mobile unit identified with a 3 includes flammable material and therefore is being sent to one of the flammable of evacuation zones (for example, 102 or 106). Conversely, the remaining mobile units contain no flammable material and therefore are being sent to the non-flammable evacuation zones (for example, 104 or 108).

It is expressly noted that the two mobile units identified by a 2 (top of the image) are quite far from the zone of danger (e.g. the fire), but these mobile units are nevertheless designated for evacuation (e.g. due to their high priority), as they contain valuable items. Only a small number of the mobile units depicted in this figure having given an identification number indicating whether, and if so, where, the mobile units will be evacuated. It is, however, noted that the optimization formula may be applied to all of the mobile units, such that each of the mobile units will be brought to an evacuation area, moved to a new location within the warehouse, or allowed to stay in their current positions.

Figure 3:
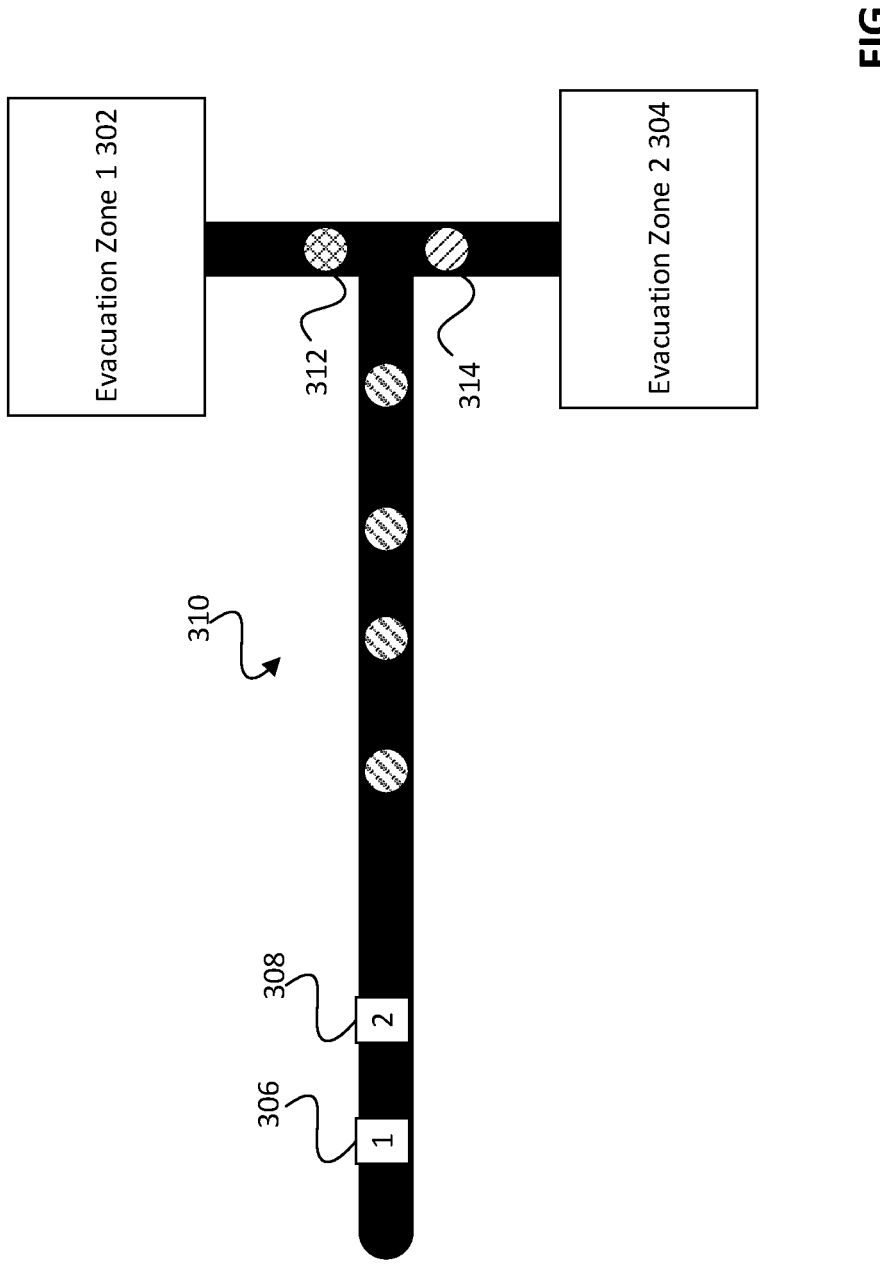
FIG. 3 depicts a targeted evacuation of a mobile units using lights of predefined frequencies.

FIG. 3 depicts a targeted evacuation of a mobile units using lights of predefined frequencies to guide the mobile units to the appropriate evacuation zones. In this figure, a warehouse includes a first evacuation zone 302 and a second evacuation zone 304. Two mobile units (of first mobile unit 306 and a second mobile unit 308) have been designated for evacuation. The first mobile unit 306 should be evacuated to evacuation zone one 302, and the second mobile unit 308 should be evacuated to evacuation zone to 304. Lights along a common evacuation path 310 are displayed at a frequency, which indicates a path to be followed. Note that the light frequencies in this figure are depicted for demonstrative purposes as patterns, such that a first pattern corresponds to a first frequency, second pattern corresponds to a second frequency etc. A light having a first frequency 312 corresponding to evacuation zone 2 302 depicts the path from a junction (e.g. the 'T' area at the end of the common path is illuminated by 310) to evacuation zone one 302, and a light having a second frequency 314 corresponding to evacuation zone 2 304 depicts the path from the junction to evacuation zone 2 304. In this manner, one or more sensors on the mobile unit and/or one or more sensors on a robot carrying the mobile unit may detect the frequency of the light being illuminated and, based on this detected frequency, determine a path to follow to reach the appropriate evacuation zone.

Figure 4:
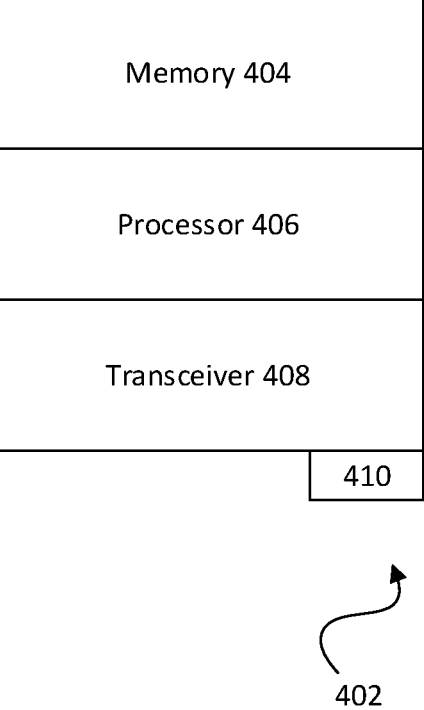
FIG. 4 depicts a server, including a memory on which a map is stored, wherein the map represents locations of a plurality of mobile units.

FIG. 4 depicts a server 402, including a memory 404 on which a map is stored, wherein the map represents locations of a plurality of mobile units; and a processor 406, configured to: generate an emergency response plan based on sensor data and the map, wherein the emergency response plan includes actions to be taken by a plurality of robots within a vicinity of the mobile units; and instruct a transceiver 408 to send a signal representing the emergency response plan. The sensor data may optionally include first sensor data from a plurality of robots and second sensor data from the plurality of mobile units. The first sensor data may, for example, include image sensor data, LiDAR data, or Radar data from a sensor of a robot of the plurality of robots. In this manner, the first sensor data may provide information about a vicinity of the robot(s) providing the sensor data. The first sensor data may further include any of temperature sensor data, moisture sensor data, or smoke detector data, which may, for example, be used to detect a fire or floor. These sensor data may obviously be tailored (e.g. the sensor type used may be tailored) to be able to detect whatever kind of disaster or emergency situation is desired to be detected. The second sensor data may include any of image sensor data, temperature sensor data, moisture sensor data, or smoke detector data.

Generating the emergency response plan may include generating a priority ranking of the mobile units, such as a priority ranking for the mobile units to be evacuated (e.g. which units should be evacuated, in which order, and to which location). This prioritization may be performed using the optimization formula as disclosed herein. This optimization formula may consider value information, representing a value of goods stored on each of the plurality of mobile units. The processor may be configured to generate the priority ranking based on the sensor data, the map, and the value of goods stored on each of the plurality of mobile units.

Where integrity data (e.g. first sensor data and/or second sensor data related to the health of the mobile units) are available, the processor may be further configured to determine an integrity of a mobile unit of the plurality of mobile units using the first sensor data and/or the second sensor data; and wherein the processor is configured to generate the emergency response plan using the determined integrity and a location of a corresponding mobile unit.

The processor 406 generating the emergency response plan may include the processor 406 generating a priority ranking of each of the plurality of mobile units. In this manner, the processor 406 may be configured to generate the priority ranking based on at least two of a value of goods stored on each of the plurality of mobile units, a location of a hazard, or an integrity of each mobile unit of the plurality of mobile units. The processor 406 may be configured to generate the priority ranking based on the value of items on each mobile unit of the plurality of mobile units, a position of each mobile unit of the plurality of mobile units relative to the hazard; and the integrity of each mobile unit of the plurality of mobile units.

The processor 406 may be further configured to generate the priority ranking by determining a maximum or a minimum of an operation reciting weighted variables represent-ing the value of items on each mobile unit of the plurality of mobile units, the position of each mobile unit of the plurality of mobile units relative to a hazard; and the integrity of each mobile unit of the plurality of mobile units. As an example of this calculation, see the optimization formula, above. The processor 406 may be further configured to determine a location of a hazard based on the first sensor data or the second sensor data, and wherein the processor is further configured to generate the emergency response plan using the location of the hazard. The hazard may be a fire or a flood, for example, or any natural disaster.

The service may include an antenna interface 110. In this manner, the transceiver 408 may be configured to send the signal representing the emergency response plan across the antenna interface. The processor 406 generating the emergency response plan may then include the processor 406 designating a first portion of a vicinity of the mobile units as being a first vicinity and a second portion of the vicinity of the mobile units as being a second vicinity. The first vicinity may be understood as an area of increased risk of harm due to the emergency situation, and the second vicinity may be understood as an area of lower risk of harm due to the emergency situation than the first vicinity. The harm may include, for example, human injury or property loss.

The processor 406 may be further configured to instruct the transceiver 408 to send an instruction to one or more of the plurality of robots to move a mobile unit of the plurality of mobile units from the first vicinity to the second vicinity. The processor 406 may be further configured to select the mobile unit of the plurality of mobile units to be moved from the first vicinity to the second vicinity based on the priority ranking of the mobile unit. The processor may be further configured to control the transceiver to send the signal instructing a first plurality of lights to operate at a first frequency and a second plurality of lights to operate at a second frequency.

In this manner, the first plurality of lights may be a plurality of lights in the first vicinity and the second plurality of lights may be a plurality of lights in the second vicinity. The plurality of mobile units may be moveable mobile units on which goods are stored.

The emergency response plan may include an instruction for a mobile unit of the plurality of mobile units to engage a fire resistant curtain and/or a water resistant curtain.

The emergency response plan may include an instruction for a mobile unit of the plurality of mobile units to engage a fire extinguishing device. The emergency response plan may include an instruction for a robot to engage a fire extinguishing device. The emergency response plan may include an instruction for a robot to engage a fire extinguishing to lead a human to a desired location.

According to a second aspect of the disclosure, a system may utilize warehouse data to assign distinctive evacuation routes to personnel and/or robots, with a primary focus on safety by steering clear of hazardous materials and areas prone to falling objects and fragile mobile units. The system may thereby guarantee the availability of clear and dependable exit routes, easily accessible doors, and efficient evacuation procedures, all contributing to an elevated level of safety. Additionally, it may tailor individualized emergency plans to each robot, crafting dynamic exit routes that maintain a safe distance from hazardous materials.

The proposed system may help to dynamically create personnel evacuation plans by prioritizing safety. This may permit the generation of real-time adjustable evacuation plans and allow for data-driven decision making in an evacuation. The system as disclosed herein may generate comprehensive reports and compliance records, which may be invaluable for meeting regulatory requirements and conducting post-incident analysis to improve safety measures.

In the event of an emergency, the system (e.g. the edge server and the robots) is primed to receive and respond to crucial alerts dispatched by the central disaster management team, which serves as the authoritative hub for overseeing and coordinating disaster-related actions throughout the entire region or country. These alerts act as pivotal notifications, relaying critical information about imminent threats, natural disasters, or other emergency situations, ensuring a prompt and organized response to safeguard lives and assets.

Figure 5:
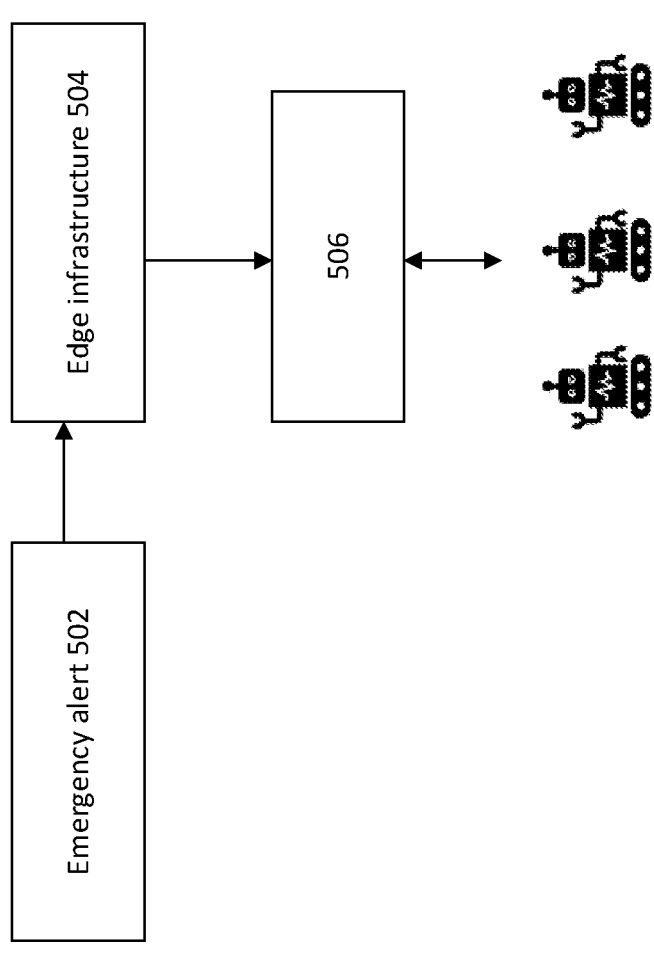
FIG. 5 depicts a central disaster management infrastructure.

FIG. 5 depicts a central disaster management infrastructure. Whenever an emergency occurs, it is assumed that existing sensors or emergency notification technology generates an appropriate emergency alert 502. This may be, for example, as simple as a smoke detector or a moisture detector, or other information available from a local sensor, or it may be information derived from a more systemic disaster alert system, such as a system to alert communities to the presence of natural disasters. Whatever the source, once the emergency alert 502 is issued, the edge infrastructure 504 receives the alert and may initiate the development of an evacuation strategy. In so doing, the edge infrastructure 504 may utilize any pertinent data within its reach. This may encompass, for example, warehousing details, including the locations of goods, which may involve hazardous materials such as oxidizing agents.

The edge infrastructure 504, or any other component described herein, may generate, update, and/or maintain a warehouse map. This warehouse map may include a real-time visualization of the positions of goods within the facility. Beyond mere spatial representations, the map may incorporate an aspect of risk assessment. Specifically, the map may include information about potential risks, such as those posed by earthquakes and fires, thereby offering an intelligent and adaptive perspective on the goods' placement within the warehouse. This dynamic map may serve as a valuable tool in optimizing both the safety and efficiency of warehouse operations, ensuring that goods are strategically located to mitigate potential hazards and respond effectively in emergency situations.

As a fallback plan, and specifically for the situation in which the edge infrastructure 504 is impacted by the emergency (e.g. the edge infrastructure 504 cannot deliver real-time plans to the robots), edge infrastructure 504 may develop a backup plan 506, which may be periodically sent to the robots and stored locally within the robot itself. This backup plan may be updated on the robots at a frequency depending on any of a variety of variables. For example, the frequency of the backup plan updates may depend on the current location, the load, the mission, etc. of the robots. In other words, and in addition to the real-time instructions that the robots receive from the edge server, the robots each have a backup plan that is locally stored in their memory. If the robots becomes disconnected from the edge server (e.g. if the edge server loses power, becomes damaged, or otherwise is unable to provide regular instructions to the robots, the robots may implement the backup plan. In some configurations, the backup plan may become active whenever a predetermined time period elapses without instructions from the edge server. Having the stored backup plan may allow the robots to create and follow a rule-driven emergency mission to a next good parking position and avoiding critical areas (e.g., human escape routes and exits, and the aforementioned areas with hazardous materials).

It is worth nothing that different ways of controlling the robots are possible in this setup. It is possible that all robots offload at least some of their tasks to the edge system and thus can directly detect an edge break down through communication timeouts. If robots operate in complete isolation, it is also possible to establish a heart beat signal to the edge system, to detect timeouts or break downs. Finally, it is also possible to establish an emergency broadcasting system, similar to other wireless emergency systems. These messages could then include the emergency plan to be executed.

Figure 6:
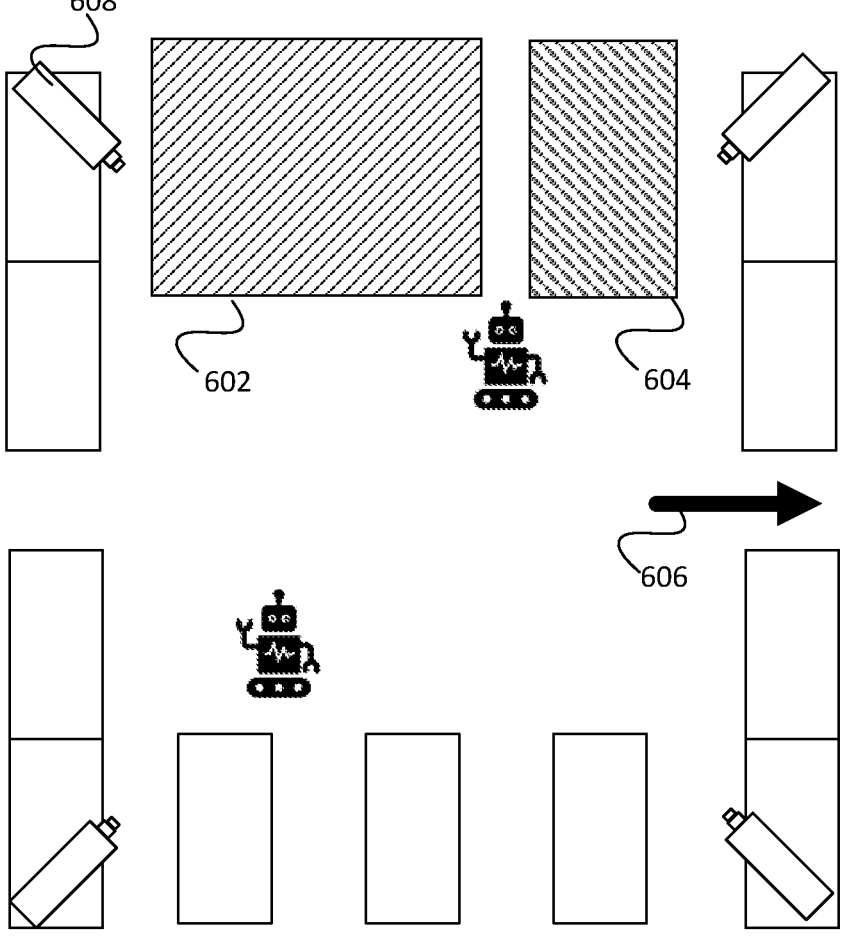
FIG. 6 depicts a warehouse with edge infrastructure in an emergency situation.

FIG. 6 depicts a warehouse with edge infrastructure in an emergency situation. In this figure, a first group of mobile units 602 is indicated as having falling objects (e.g. objects from these shelves are falling to the ground, thereby creating a hazard (e.g. falling objects), as well as potential obstacles for an evacuation. A second group of mobile units 604 is indicated as carrying hazardous materials (e.g. flammable or explosive) materials. An escape route is marked as 606. Various sensors 608 for the edge infrastructure are depicted.

In this figure, the deployed robots, in conjunction with the edge infrastructure, are continually scanning for the presence of humans by using their perception systems and localized sensors. The gathered information is then disseminated to all edge devices, and the remaining individuals are directed toward exit routes through the communication channels accessible via the robots. As illustrated in FIG. 6, the warehouse emergency response system adeptly oversees high-risk zones, addressing situations involving trapped individuals and precarious shelving. The edge infrastructure maintains continuous surveillance of these areas via deployed perception systems to identify potential risk zones. It proactively restricts human access to these areas and expeditiously communicates this critical information to both the edge and local emergency response teams, including firefighters, ensuring swift and responsive actions.

In an optional configuration, badge scanning data may be incorporated into the solution disclosed herein, such that the number of individuals entering the warehouse area and those exiting during the evacuation is recorded. This information may be vital for ensuring that no person is inadvertently left behind. If someone is unintentionally left behind for a limited duration, one or more robots can be deployed to search for and rescue said person.

Figure 7:
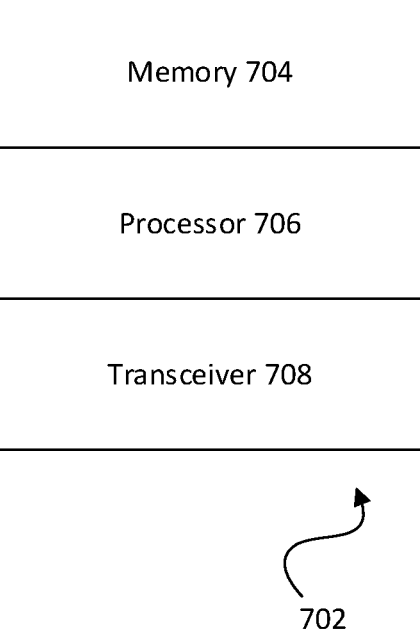
FIG. 7 depicts a server for implementation of the second aspect of the disclosure.

In a further optional configuration, one or more durable evacuation robots may be maintained within a fleet of robots. This proactive measure enhances the readiness to respond to emergency situations by tending to the high risk zones and monitoring the situation comprehensively FIG. 7 depicts a server 702 for implementation of the second aspect of the disclosure. This server 702 may include a memory 704 on which a map is stored, The map may represents locations of a plurality of mobile units. The server 702 may include a processor 706, which may be configured to generate an emergency response plan based on sensor data and the map. The emergency response plan may include actions to be taken by a plurality of robots within a vicinity of the mobile units. The server 702 may be configured to instruct a transceiver 708 to send a signal representing the emergency response plan.

The map may further include areas of ingress or egress of a vicinity of the plurality of mobile units. In this manner, the emergency response plan may include a robot leading a human to one of the areas of ingress or the areas of egress.

The processor 706 generating the emergency response plan may include the processor 706 designating a first portion of a vicinity of the mobile units as being a first vicinity and a second portion of the vicinity of the mobile units as being a second vicinity. In this manner, the first vicinity may be an area of increased risk of harm due to the emergency situation, and the second vicinity may be an area of lower risk of harm due to the emergency situation than the first vicinity. Correspondingly, the emergency response plan may include an instruction for a robot to lead a human to the area of ingress or the area of egress, through the second vicinity. The emergency response plan may further include an instruction for the robot to lead the human to the area of ingress or the area of egress, by avoiding an area of the second vicinity.

The emergency response plan may further include an instruction for the robot to inform a human about a danger. In this manner, the emergency response plan may further include an instruction for the robot to limit human access to an area of increased danger. The memory may further include identifiers of humans who are in a vicinity of the plurality of mobile units.

In an optional configuration, the server 702 may be further configured to receive first information representing identifiers of the humans who enter the vicinity of the plurality of mobile units, and second information representing identifiers of the humans who exit the vicinity of the plurality of mobile units, and to update the identifiers of the humans who are in the vicinity of the plurality of mobile units, as stored in the memory.

The processor 706 may be configured to control a transceiver 708 to periodically send a signal representing the emergency response plan, for implementation upon a loss of connection between the server and a robot. In this manner, the emergency response plan becomes locally stored on the various robots, which may then implement the emergency response plan in the event that connection with the edge server 702 is lost. The emergency response plan may include an instruction for a robot to move a mobile unit of the plurality of mobile units from areas of high risk to an area of low risk and/or an instruction for a robot to increase a height of a mobile unit.

Further aspects of the disclosure will be described by way of example:

In Example 1, a server, including: a memory on which a map is stored, wherein the map represents locations of a plurality of mobile units; and a processor, configured to: generate an emergency response plan based on sensor data and the map, wherein the emergency response plan includes actions to be taken by a plurality of robots within a vicinity of the mobile units; and instruct a transceiver to send a signal representing the emergency response plan.

In Example 2, the server of Example 1, wherein the sensor data include first sensor data from a plurality of robots and second sensor data from the plurality of mobile units.

In Example 3, the server of Example 2, wherein the first sensor data include image sensor data, LiDAR data, or Radar data from a sensor of a robot of the plurality of robots.

In Example 4, the server of Example 3, wherein the first sensor data further include any of temperature sensor data, moisture sensor data, or smoke detector data.

In Example 5, the server of any one of Examples 2 to 4, wherein the second sensor data include any of image sensor data, temperature sensor data, moisture sensor data, or smoke detector data.

In Example 6, the server of any one of Examples 1 to 5, wherein generating the emergency response plan includes generating a priority ranking of the mobile units.

In Example 7, the server of Example 6, further including value information, representing a value of goods stored on each of the plurality of mobile units; and wherein the processor is configured to generate the priority ranking based on the sensor data, the map, and the value of goods stored on each of the plurality of mobile units.

In Example 8, the server of Example 7, wherein the processor is further configured to determine an integrity of a mobile unit of the plurality of mobile units using the first sensor data and/or the second sensor data; and wherein the processor is configured to generate the emergency response plan using the determined integrity and a location of a corresponding mobile unit.

In Example 9, the server of any one of Examples 2 to 8, wherein the processor generating the emergency response plan includes the processor generating a priority ranking of each of the plurality of mobile units; wherein the processor is configured to generate the priority ranking based on at least two of a value of goods stored on each of the plurality of mobile units, a location of a hazard, or an integrity of each mobile unit of the plurality of mobile units.

In Example 10, the server of Example 9, wherein the processor is configured to generate the priority ranking based on the value of items on each mobile unit of the plurality of mobile units, a position of each mobile unit of the plurality of mobile units relative to the hazard; and the integrity of each mobile unit of the plurality of mobile units.

In Example 11, the server of Example 10, wherein the processor is further configured to generate the priority ranking by determining a maximum or a minimum of an operation reciting weighted variables representing the value of items on each mobile unit of the plurality of mobile units, the position of each mobile unit of the plurality of mobile units relative to a hazard; and the integrity of each mobile unit of the plurality of mobile units In Example 12, the server of any one of Examples 2 to 11, wherein the processor is further configured to determine a location of a hazard based on the first sensor data or the second sensor data, and wherein the processor is further configured to generate the emergency response plan using the location of the hazard.

In Example 13, the server of Example 12, wherein the hazard is a fire.

In Example 14, the server of Example 12, wherein the hazard is a flood.

In Example 15, the server of Example 14, further including an antenna interface, wherein the transceiver is configured to send the signal representing the emergency response plan across the antenna interface.

In Example 16, the server of any one of Examples 2 to 15, wherein the processor generating the emergency response plan includes the processor designating a first portion of a vicinity of the mobile units as being a first vicinity and a second portion of the vicinity of the mobile units as being a second vicinity; wherein the first vicinity is an area of increased risk of harm due to the emergency situation, and wherein the second vicinity is an area of lower risk of harm due to the emergency situation than the first vicinity.

In Example 17, the server of Example 16, wherein the harm includes human injury or property loss.

In Example 18, the server of Example 16 or 17, wherein the processor is further configured to instruct the transceiver to send an instruction to one or more of the plurality of robots to move a mobile unit of the plurality of mobile units from the first vicinity to the second vicinity.

In Example 19, the server of Example 18, wherein the processor is further configured to select the mobile unit of the plurality of mobile units to be moved from the first vicinity to the second vicinity based on the priority ranking of the mobile unit.

In Example 20, the server of any one of Examples 17 to 19, wherein the processor is further configured to control the transceiver to send a signal instructing a first plurality of lights to operate at a first frequency and a second plurality of lights to operate at a second frequency.

In Example 21, the server of Example 20, wherein the first plurality of lights is a plurality of lights in the first vicinity and the second plurality of lights is a plurality of lights in the second vicinity.

In Example 22, the server of any one of Examples 1 to 21, wherein the plurality of mobile units are moveable mobile units on which goods are stored.

In Example 23, the server of any one of Examples 1 to 22, wherein the emergency response plan includes an instruction for a mobile unit of the plurality of mobile units to engage a fire resistant curtain and/or a water resistant curtain.

In Example 24, the server of any one of Examples 1 to 23, wherein the emergency response plan includes an instruction for a mobile unit of the plurality of mobile units to engage a fire extinguishing device.

In Example 25, the server of any one of Examples 1 to 24, wherein the emergency response plan includes an instruction for a robot to engage a fire extinguishing device.

In Example 26, the server of any one of Examples 1 to 25, wherein the emergency response plan includes an instruction for a robot to engage a fire extinguishing to lead a human to a desired location.

In Example 27, the server of any one of Examples 1 to 26, further including the transceiver.

In Example 28, a non-transitory computer readable medium, including instructions which, if executed by a processor, cause the processor to: generate an emergency response plan based on sensor data and a map representing locations of a plurality of mobile units, wherein the emergency response plan includes actions to be taken by a plurality of robots within a vicinity of the mobile units; and instruct a transceiver to send a signal representing the emergency response plan.

In Example 29, the non-transitory computer readable medium of Example 28, wherein the sensor data include first sensor data from a plurality of robots and second sensor data from the plurality of mobile units.

In Example 30, the non-transitory computer readable medium of Example 29, wherein the first sensor data include image sensor data, LiDAR data, or Radar data from a sensor of a robot of the plurality of robots.

In Example 31, the non-transitory computer readable medium of Example 30, wherein the first sensor data further include any of temperature sensor data, moisture sensor data, or smoke detector data.

In Example 32, the non-transitory computer readable medium of any one of Examples 29 to 31, wherein the second sensor data include any of image sensor data, temperature sensor data, moisture sensor data, or smoke detector data.

In Example 33, the non-transitory computer readable medium of any one of Examples 28 to 32, wherein generating the emergency response plan includes generating a priority ranking of the mobile units.

In Example 34, the non-transitory computer readable medium of Example 33, further including value information, representing a value of goods stored on each of the plurality of mobile units; and wherein the instructions are configured to cause the processor to generate the priority ranking based on the sensor data, the map and the value of goods stored on each of the plurality of mobile units.

In Example 35, the non-transitory computer readable medium of Example 34, wherein the instructions are further configured to cause the processor to determine an integrity of a mobile unit of the plurality of mobile units using the first sensor data and/or the second sensor data; and wherein the processor is configured to generate the emergency response plan using the determined integrity and a location of a corresponding mobile unit.

In Example 36, the non-transitory computer readable medium of any one of Examples 29 to 35, wherein the generating the emergency response plan includes generating a priority ranking of each of the plurality of mobile units; wherein the instructions are configured to cause the processor to generate the priority ranking based on at least two of a value of goods stored on each of the plurality of mobile units, a location of a hazard, or an integrity of each mobile unit of the plurality of mobile units.

In Example 37, the non-transitory computer readable medium of Example 36, wherein the instructions are configured to cause the processor to generate the priority ranking based on the value of items on each mobile unit of the plurality of mobile units, a position of each mobile unit of the plurality of mobile units relative to the hazard; and the integrity of each mobile unit of the plurality of mobile units.

In Example 38, the non-transitory computer readable medium of Example 37, wherein the instructions are further configured to cause the processor to generate the priority ranking by determining a maximum or a minimum of an operation reciting weighted variables representing the value of items on each mobile unit of the plurality of mobile units, the position of each mobile unit of the plurality of mobile units relative to a hazard; and the integrity of each mobile unit of the plurality of mobile units In Example 39, the non-transitory computer readable medium of any one of Examples 29 to 38, wherein the instructions are further configured to cause the processor to determine a location of a hazard based on the first sensor data or the second sensor data, and wherein the instructions are further configured to cause the processor to generate the emergency response plan using the location of the hazard.

In Example 40, the non-transitory computer readable medium of Example 39, wherein the hazard is a fire.

In Example 41, the non-transitory computer readable medium of Example 39, wherein the hazard is a flood.

In Example 42, the non-transitory computer readable medium of any one of Examples 29 to 41, wherein the instructions causing the processor to generate the emergency response plan includes the instructions causing the processor to designate a first portion of a vicinity of the mobile units as being a first vicinity and a second portion of the vicinity of the mobile units as being a second vicinity; wherein the first vicinity is an area of increased risk of harm due to the emergency situation, and wherein the second vicinity is an area of lower risk of harm due to the emergency situation than the first vicinity.

In Example 43, the non-transitory computer readable medium of Example 42, wherein the harm includes human injury or property loss.

In Example 44, the non-transitory computer readable medium of Example 42 or 43, wherein the instructions are further configured to cause the processor to instruct the transceiver to send an instruction to one or more of the plurality of robots to move a mobile unit of the plurality of mobile units from the first vicinity to the second vicinity.

In Example 45, the non-transitory computer readable medium of Example 44, wherein the instructions are further configured to cause the processor to select the mobile unit of the plurality of mobile units to be moved from the first vicinity to the second vicinity based on the priority ranking of the mobile unit.

In Example 46, the non-transitory computer readable medium of any one of Examples 43 to 45, wherein the instructions are further configured to cause the processor to control the transceiver to send a signal instructing a first plurality of lights to operate at a first frequency and a second plurality of lights to operate at a second frequency.

In Example 47, the non-transitory computer readable medium of Example 46, wherein the first plurality of lights is a plurality of lights in the first vicinity and the second plurality of lights is a plurality of lights in the second vicinity.

In Example 48, the non-transitory computer readable medium of any one of Examples 28 to 47, wherein the plurality of mobile units are moveable mobile units on which goods are stored.

In Example 49, the non-transitory computer readable medium of any one of Examples 28 to 48, wherein the emergency response plan includes an instruction for a mobile unit of the plurality of mobile units to engage a fire resistant curtain and/or a water resistant curtain.

In Example 50, the non-transitory computer readable medium of any one of Examples 28 to 49, wherein the emergency response plan includes an instruction for a mobile unit of the plurality of mobile units to engage a fire extinguishing device.

In Example 51, the non-transitory computer readable medium of any one of Examples 28 to 50, wherein the emergency response plan includes an instruction for a robot to engage a fire extinguishing device.

In Example 52, the non-transitory computer readable medium of any one of Examples 28 to 51, wherein the emergency response plan includes an instruction for a robot to engage a fire extinguishing to lead a human to a desired location.

In Example 53, a method of emergency management, including:

generating an emergency response plan based on sensor data and a map, wherein the map represents locations of a plurality of mobile units and wherein the emergency response plan includes actions to be taken by a plurality of robots within a vicinity of the mobile units; and instructing a transceiver to send a signal representing the emergency response plan.

In Example 54, the method of Example 53, wherein the sensor data include first sensor data from a plurality of robots and second sensor data from the plurality of mobile units.

In Example 55, the method of Example 54, wherein the first sensor data include image sensor data, LiDAR data, or Radar data from a sensor of a robot of the plurality of robots.

In Example 56, the method of Example 55, wherein the first sensor data further include any of temperature sensor data, moisture sensor data, or smoke detector data.

In Example 57, the method of any one of Examples 54 to 56, wherein the second sensor data include any of image sensor data, temperature sensor data, moisture sensor data, or smoke detector data.

In Example 58, the method of any one of Examples 53 to 57, wherein generating the emergency response plan includes generating a priority ranking of the mobile units.

In Example 59, the method of Example 58, further including value information, representing a value of goods stored on each of the plurality of mobile units; and further including generating the priority ranking based on the sensor data, the map, and the value of goods stored on each of the plurality of mobile units.

In Example 60, the method of Example 59, further including determining an integrity of a mobile unit of the plurality of mobile units using the first sensor data and/or the second sensor data; and w generating the emergency response plan using the determined integrity and a location of a corresponding mobile unit.

In Example 61, the method of any one of Examples 54 to 60, wherein generating the emergency response plan includes generating a priority ranking of each of the plurality of mobile units; wherein generating the priority ranking includes generating the priority ranking based on at least two of a value of goods stored on each of the plurality of mobile units, a location of a hazard, or an integrity of each mobile unit of the plurality of mobile units.

In Example 62, the method of Example 61, further including generating the priority ranking based on the value of items on each mobile unit of the plurality of mobile units, a position of each mobile unit of the plurality of mobile units relative to the hazard; and the integrity of each mobile unit of the plurality of mobile units.

In Example 63, the method of Example 62, further including generating the priority ranking by determining a maximum or a minimum of an operation reciting weighted variables representing the value of items on each mobile unit of the plurality of mobile units, the position of each mobile unit of the plurality of mobile units relative to a hazard; and the integrity of each mobile unit of the plurality of mobile units.

In Example 64, the method of any one of Examples 54 to 63, further including determining a location of a hazard based on the first sensor data or the second sensor data, and wherein the processor is further configured to generate the emergency response plan using the location of the hazard.

In Example 65, the method of Example 64, wherein the hazard is a fire.

In Example 66, the method of Example 64, wherein the hazard is a flood.

In Example 67, the method of any one of Examples 54 to 66, wherein the generating the emergency response plan includes designating a first portion of a vicinity of the mobile units as being a first vicinity and a second portion of the vicinity of the mobile units as being a second vicinity; wherein the first vicinity is an area of increased risk of harm due to the emergency situation, and wherein the second vicinity is an area of lower risk of harm due to the emergency situation than the first vicinity.

In Example 68, the method of Example 67, wherein the harm includes human injury or property loss.

In Example 69, the method of Example 67 or 68, further including instructing the transceiver to send an instruction to one or more of the plurality of robots to move a mobile unit of the plurality of mobile units from the first vicinity to the second vicinity.

In Example 70, the method of Example 69, further including selecting the mobile unit of the plurality of mobile units to be moved from the first vicinity to the second vicinity based on the priority ranking of the mobile unit.

In Example 71, the method of any one of Examples 68 to 70, further including controlling the transceiver to send a signal instructing a first plurality of lights to operate at a first frequency and a second plurality of lights to operate at a second frequency.

In Example 72, the method of Example 71, wherein the first plurality of lights is a plurality of lights in the first vicinity and the second plurality of lights is a plurality of lights in the second vicinity.

In Example 73, the method of any one of Examples 53 to 72, wherein the plurality of mobile units are moveable mobile units on which goods are stored.

In Example 74, the method of any one of Examples 53 to 73, wherein the emergency response plan includes an instruction for a mobile unit of the plurality of mobile units to engage a fire resistant curtain and/or a water resistant curtain.

In Example 75, the method of any one of Examples 53 to 74, wherein the emergency response plan includes an instruction for a mobile unit of the plurality of mobile units to engage a fire extinguishing device.

In Example 76, the method of any one of Examples 53 to 75, wherein the emergency response plan includes an instruction for a robot to engage a fire extinguishing device.

In Example 77, the method of any one of Examples 53 to 76, wherein the emergency response plan includes an instruction for a robot to engage a fire extinguishing to lead a human to a desired location.

In Example 78, the server of any one of Examples 53 to 77, wherein the map further includes areas of ingress or egress of a vicinity of the plurality of mobile units, and wherein the emergency response plan includes a robot leading a human to one of the areas of ingress or the areas of egress.

In Example 79, the server of Example 1, wherein the processor generating the emergency response plan includes the processor designating a first portion of a vicinity of the mobile units as being a first vicinity and a second portion of the vicinity of the mobile units as being a second vicinity; wherein the first vicinity is an area of increased risk of harm due to the emergency situation, and wherein the second vicinity is an area of lower risk of harm due to the emergency situation than the first vicinity; and wherein the emergency response plan includes an instruction for a robot to lead a human to the area of ingress or the area of egress, through the second vicinity.

In Example 80, the server of Example 79, wherein the emergency response plan further includes an instruction for the robot to lead the human to the area of ingress or the area of egress, by avoiding an area of the second vicinity.

In Example 81, the server of Example 80, wherein the emergency response plan further includes an instruction for the robot to inform a human about a danger.

In Example 82, the server of any one of Examples 53 to 81, wherein the emergency response plan further includes an instruction for the robot to limit human access to an area of increased danger.

In Example 83, the server of any one of Examples 53 to 82, wherein the memory further includes identifiers of humans who are in a vicinity of the plurality of mobile units.

In Example 84, the server of Example 83, wherein the server is further configured to receive first information representing identifiers of the humans who enter the vicinity of the plurality of mobile units, and second information representing identifiers of the humans who exit the vicinity of the plurality of mobile units, and to update the identifiers of the humans who are in the vicinity of the plurality of mobile units, as stored in the memory.

In Example 85, the server of any one of Examples 53 to 84, wherein the processor is configured to periodically send to the transceiver the signal representing the emergency response plan, for implementation upon a loss of connection between the server and a robot.

In Example 86, the server of any one of Examples 53 to 85, wherein the emergency response plan includes an instruction for a robot to move a mobile unit of the plurality of mobile units from an areas of high risk to an area of low risk.

In Example 87, the server of any one of Examples 53 to 86, wherein the emergency response plan includes an instruction for a robot to increase a height of a mobile unit.

In Example 88, a non-transitory computer readable medium, including instructions which, if executed by a processor, cause the processor to: generate an emergency response plan based on sensor data and a map representing locations of a plurality of mobile units, wherein the emergency response plan includes actions to be taken by a plurality of robots within a vicinity of the mobile units; and instruct a transceiver to send a signal representing the emergency response plan.

In Example 89, the non-transitory computer readable medium of Example 88, wherein the map further includes areas of ingress or egress of a vicinity of the plurality of mobile units, and wherein the emergency response plan includes a robot leading a human to one of the areas of ingress or the areas of egress.

In Example 90, the non-transitory computer readable medium of Example 89 or 89, wherein the instructions are configured to cause the processor to generate the emergency response plan by designating a first portion of a vicinity of the mobile units as being a first vicinity and a second portion of the vicinity of the mobile units as being a second vicinity; wherein the first vicinity is an area of increased risk of harm due to the emergency situation, and wherein the second vicinity is an area of lower risk of harm due to the emergency situation than the first vicinity; and wherein the emergency response plan includes an instruction for a robot to lead a human to the area of ingress or the area of egress, through the second vicinity.

In Example 91, the non-transitory computer readable medium of Example 90, wherein the emergency response plan further includes an instruction for the robot to lead the human to the area of ingress or the area of egress, by avoiding an area of the second vicinity.

In Example 92, the non-transitory computer readable medium of Example 91, wherein the emergency response plan further includes an instruction for the robot to inform a human about a danger.

In Example 93, the non-transitory computer readable medium of any one of Examples 88 to 92, wherein the emergency response plan further includes an instruction for the robot to limit human access to an area of increased danger.

In Example 94, the non-transitory computer readable medium of any one of Examples 88 to 93, wherein the memory further includes identifiers of humans who are in a vicinity of the plurality of mobile units.

In Example 95, the non-transitory computer readable medium of Example 94, wherein the instructions are further configured to cause the processor to receive first information representing identifiers of the humans who enter the vicinity of the plurality of mobile units, and second information representing identifiers of the humans who exit the vicinity of the plurality of mobile units, and to update the identifiers of the humans who are in the vicinity of the plurality of mobile units, as stored in the memory.

In Example 96, the non-transitory computer readable medium of any one of Examples 88 to 95, wherein the instructions are configured to periodically send to the transceiver the signal representing the emergency response plan, for implementation upon a loss of connection between the server and a robot.

In Example 97, the non-transitory computer readable medium of any one of Examples 88 to 96, wherein the emergency response plan includes an instruction for a robot to move a mobile unit of the plurality of mobile units from an areas of high risk to an area of low risk.

In Example 98, the non-transitory computer readable medium of any one of Examples 88 to 97, wherein the emergency response plan includes an instruction for a robot to increase a height of a mobile unit.

In Example 99, a method of emergency management, including: generating an emergency response plan based on sensor data and a map, wherein the map represents locations of a plurality of mobile units and wherein the emergency response plan includes actions to be taken by a plurality of robots within a vicinity of the mobile units; and instructing a transceiver to send a signal representing the emergency response plan.

In Example 100, the method of any one of Examples 99 to 99, wherein the map further includes areas of ingress or egress of a vicinity of the plurality of mobile units, and wherein the emergency response plan includes a robot leading a human to one of the areas of ingress or the areas of egress.

In Example 101, the method of any one of Examples 100 to 100, wherein the generating the emergency response plan includes designating a first portion of a vicinity of the mobile units as being a first vicinity and a second portion of the vicinity of the mobile units as being a second vicinity; wherein the first vicinity is an area of increased risk of harm due to the emergency situation, and wherein the second vicinity is an area of lower risk of harm due to the emergency situation than the first vicinity; and wherein the emergency response plan includes an instruction for a robot to lead a human to the area of ingress or the area of egress, through the second vicinity.

In Example 102, the method of Example 101, wherein the emergency response plan further includes an instruction for the robot to lead the human to the area of ingress or the area of egress, by avoiding an area of the second vicinity.

In Example 103, the method of Example 102, wherein the emergency response plan further includes an instruction for the robot to inform a human about a danger.

In Example 104, the method of any one of Examples 99 to 103, wherein the emergency response plan further includes an instruction for the robot to limit human access to an area of increased danger.

In Example 105, the method of any one of Examples 99 to 104, wherein the memory further includes identifiers of humans who are in a vicinity of the plurality of mobile units.

In Example 106, the method of Example 105, further including receiving first information representing identifiers of the humans who enter the vicinity of the plurality of mobile units, and second information representing identifiers of the humans who exit the vicinity of the plurality of mobile units, and updating the identifiers of the humans who are in the vicinity of the plurality of mobile units, as stored in the memory.

In Example 107, the method of any one of Examples 99 to 106, further including periodically sending to the transceiver the signal representing the emergency response plan, for implementation upon a loss of connection between the server and a robot.

In Example 108, the method of any one of Examples 99 to 107, wherein the emergency response plan includes an instruction for a robot to move a mobile unit of the plurality of mobile units from an areas of high risk to an area of low risk.

In Example 109, the method of any one of Examples 99 to 108, wherein the emergency response plan includes an instruction for a robot to increase a height of a mobile unit.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A server, comprising:

a memory on which a map is stored, wherein the map represents locations of a plurality of mobile units and value information, representing a value of goods stored on each of the plurality of mobile units; and a processor, configured to:

generate a priority ranking of the plurality of mobile units based on the value information;

designate a first portion of a vicinity of the plurality of mobile units as being a first vicinity and a second portion of the vicinity of the plurality of mobile units as being a second vicinity, wherein the first vicinity is an area of increased risk of harm due to an emergency situation, and wherein the second vicinity is an area of lower risk of harm due to the emergency situation than the first vicinity;

generate an emergency response plan based on sensor data, the map, the priority ranking, and a location of a mobile unit of the plurality of mobile units within the first vicinity; wherein the emergency response plan comprises actions to be taken by a plurality of robots within the vicinity of the plurality of mobile units, the plurality of robots being distinct from, and independently controllable relative to, the plurality of mobile units; and instruct the transceiver to send an instruction to control one or more of the plurality of robots to move the mobile unit of the plurality of mobile units from the first vicinity to the second vicinity in accordance with the emergency response plan.

2. The server of claim 1, wherein the sensor data comprise first sensor data from the plurality of robots and second sensor data from the plurality of mobile units.

3. The server of claim 1, wherein the processor is configured to generate the priority ranking based on the sensor data, the map, and the value of goods stored on each of the plurality of mobile units.

4. The server of claim 2, wherein the processor is further configured to determine an integrity of a respective mobile unit of the plurality of mobile units using the first sensor data and/or the second sensor data; and wherein the processor is configured to generate the emergency response plan using the integrity and a location of the respective mobile unit.

5. The server of claim 2, wherein the processor configured to generate the priority ranking of the plurality of mobile units, comprises the processor generating the priority ranking of each of the plurality of mobile units; wherein the processor is configured to generate the priority ranking based on at least two of a value of goods stored on each of the plurality of mobile units, a location of a hazard, or an integrity of each mobile unit of the plurality of mobile units.

6. The server of claim 5, wherein the processor is configured to generate the priority ranking based on the value of items on each mobile unit of the plurality of mobile units, a position of each mobile unit of the plurality of mobile units relative to the hazard; and the integrity of each mobile unit of the plurality of mobile units.

7. The server of claim 6, wherein the processor is further configured to generate the priority ranking by determining a maximum or a minimum of an operation reciting weighted variables representing the value of items on each mobile unit of the plurality of mobile units, the position of each mobile unit of the plurality of mobile units relative to a hazard; and the integrity of each mobile unit of the plurality of mobile units.

8. The server of claim 1, wherein the processor is further configured to select the mobile unit of the plurality of mobile units to be moved from the first vicinity to the second vicinity based on the priority ranking of the mobile unit.

9. The server of claim 1, wherein the processor is further configured to control the transceiver to send a signal instructing a first plurality of lights to operate at a first frequency and a second plurality of lights to operate at a second frequency, wherein the first plurality of lights is a plurality of lights in the first vicinity and the second plurality of lights is a plurality of lights in the second vicinity.

10. The server of claim 1, wherein the emergency response plan comprises an instruction for a respective mobile unit of the plurality of mobile units to engage a fire resistant curtain and/or a water resistant curtain, or wherein the emergency response plan comprises an instruction for the respective mobile unit of the plurality of mobile units to engage a fire extinguishing device.

11. The server of claim 1, wherein the emergency response plan comprises an instruction for a robot to lead a human to a desired location.

12. The server of claim 1, wherein the map further comprises areas of ingress or egress of the vicinity of the plurality of mobile units, and wherein the emergency response plan comprises a robot leading a human to one of the areas of ingress or the areas of egress.

13. The server of claim 2, wherein the emergency response plan comprises an instruction for a robot to lead a human to the area of ingress or the area of egress, through the second vicinity.

14. The server of claim 13, wherein the emergency response plan further comprises an instruction for the robot to lead the human to the area of ingress or the area of egress, by bypassing an area of the second vicinity.

15. The server of claim 1, wherein the memory further comprises identifiers of humans who are in the vicinity of the plurality of mobile units; and wherein the server is further configured to receive first information representing identifiers of the humans who are in the vicinity of the plurality of mobile units, and second information representing identifiers of the humans who exit the vicinity of the plurality of mobile units, and to update the identifiers of the humans who are in the vicinity of the plurality of mobile units, as stored in the memory.

16. The server of claim 1, wherein the processor is configured to periodically send to the transceiver the signal representing the emergency response plan, for implementation upon a loss of connection between the server and a robot.

17. The server of claim 1, wherein the emergency response plan comprises an instruction for a robot to move a respective mobile unit of the plurality of mobile units from an area of high risk to an area of low risk.

18. A non-transitory computer readable medium, comprising instructions which, if executed by a processor, cause the processor to:

generate a priority ranking of a plurality of mobile units based on value information representing a value of goods stored on each of the plurality of mobile units;

designate a first portion of a vicinity of the plurality of mobile units as being a first vicinity and a second portion of the vicinity of the plurality of mobile units as being a second vicinity, wherein the first vicinity is an area of increased risk of harm due to an emergency situation, and wherein the second vicinity is an area of lower risk of harm due to the emergency situation than the first vicinity;

generate an emergency response plan based on sensor data, a map of the vicinity of the plurality of mobile units, the priority ranking, and a location of a mobile unit of the plurality of mobile units within the first vicinity; wherein the emergency response plan comprises actions to be taken by a plurality of robots within the vicinity of the plurality of mobile units, the plurality of robots being distinct from, and independently controllable relative to, the plurality of mobile units; and instruct the transceiver to send an instruction to control one or more of the plurality of robots to move the mobile unit of the plurality of mobile units from the first vicinity to the second vicinity in accordance with the emergency response plan.

19. The non-transitory computer readable medium of claim 18, wherein the sensor data comprise first sensor data from the plurality of robots and second sensor data from the plurality of mobile units.

* * * * *